(12) United States Patent
Tanaka

(10) Patent No.: US 10,630,337 B2
(45) Date of Patent: Apr. 21, 2020

(54) RADIO COMMUNICATION APPARATUS, RADIO COMMUNICATION SYSTEM, AND TRANSMISSION METHOD

(71) Applicant: FUJITSU LIMITED, Kawasaki-shi, Kanagawa (JP)

(72) Inventor: Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/393,441

(22) Filed: Apr. 24, 2019

(65) Prior Publication Data
US 2019/0253099 A1 Aug. 15, 2019

Related U.S. Application Data

(63) Continuation of application No. PCT/JP2016/082688, filed on Nov. 2, 2016.

(51) Int. Cl.
*H04B 1/69* (2011.01)
*H04L 27/26* (2006.01)
(Continued)

(52) U.S. Cl.
CPC ............... *H04B 1/69* (2013.01); *H04B 1/707* (2013.01); *H04J 13/004* (2013.01); *H04L 27/26* (2013.01); *H04L 27/2626* (2013.01)

(58) Field of Classification Search
CPC .......... H04J 13/004; H04J 13/10; H04J 13/00; H04B 1/707; H04B 1/69; H04B 1/7075; H04L 27/2626; H04L 27/26
See application file for complete search history.

(56) References Cited

U.S. PATENT DOCUMENTS 5,745,480 A * 4/1998 Behtash ................. H04J 13/00
370/252
2006/0146913 A1* 7/2006 Feher ....................... H04B 1/69
375/130
(Continued)

FOREIGN PATENT DOCUMENTS

JP 2007-97186 A 4/2007
JP 2013-247513 A 12/2013
JP 2016-158304 A 9/2016

OTHER PUBLICATIONS

Samsung, "Evaluation results of superposition scheme in case of multiplexing eMBB and URLLC", Agenda Item: 8.1.2.2, 3GPP TSG RAN WG1 Meeting #86bis, R1-1609058, Lisbon, Portugal, Oct. 10-14, 2016.
(Continued)

*Primary Examiner* — Ted M Wang
(74) *Attorney, Agent, or Firm* — Myers Wolin, LLC

(57) ABSTRACT

A radio communication apparatus includes: a modulating unit that modulates data to be transmitted by being arranged in a first resource area of a radio signal; a first spreading modulation unit that performs, by using a code, spreading modulation on data to be transmitted by being arranged in a second resource area provided in the first resource area; a mapping unit that maps the data modulated by the modulating unit onto the first resource area and that maps the data subjected to the spreading modulation by the first spreading modulation unit onto the second resource area; and a transmitter that transmits a signal obtained by mapping performed by the mapping unit.

6 Claims, 13 Drawing Sheets

(51) Int. Cl.
 *H04J 13/00* (2011.01)
 *H04B 1/707* (2011.01)

(56) References Cited

U.S. PATENT DOCUMENTS

| | | | |
|---|---|---|---|
| 2007/0081613 | A1 | 4/2007 | Kim et al. |
| 2012/0275409 | A1* | 11/2012 | Han .................. H04L 1/0007 370/329 |
| 2013/0329684 | A1 | 12/2013 | Horiuchi et al. |
| 2015/0171983 | A1 | 6/2015 | Kusashima |

OTHER PUBLICATIONS

NTT DOCOMO, Inc., "Discussion on multiple access for UL mMTC", Agenda Item: 8.1.2.2, 3GPP TSG RAN WG1 Meeting #86, R1-167392, Gothenburg, Sweden, Aug. 22-26, 2016.

Fujitsu, "eMBB and URLLC Multiplexing for DL", Agenda Item: 7.1.4.4, 3GPP TSG RAN WG1 Meeting #87, R1-1611895, Reno, USA, Nov. 14-18, 2016.

NTT DOCOMO, Inc., "New SID Proposal: Study on New Radio Access Technology", Agenda Item: 9.1, 3GPP TSG RAN Meeting #71, RP-160671, Götteborg, Sweden, Mar. 7-10, 2010.

3GPP TR 38.913 V0.3.0, "3rd Generation Partnership Project; Technical Specification Group Radio Access Network; Study on Scenarios and Requirements for Next Generation Access Technologies; (Release 14)", Mar. 2016.

NTT DOCOMO, Inc., "On co-existence of eMBB and URLLC", Agenda Item: 8.1.8, 3GPP TSG RAN WG1 Meeting #86, R1-167391, Gothenburg, Sweden, Aug. 22-26, 2016.

International Search Report with Written Opinion of the International Searching Authority issued by the Japan Patent Office for corresponding International Patent Application No. PCT/JP2016/082688, dated Jan. 24, 2017, with an English translation.

* cited by examiner

RADIO COMMUNICATION APPARATUS, RADIO COMMUNICATION SYSTEM, AND TRANSMISSION METHOD

CROSS-REFERENCE TO RELATED APPLICATION

This application is a continuation of International Application No. PCT/JP2016/082688, filed on Nov. 2, 2016, the entire contents of which are herein incorporated by reference.

FIELD

The embodiments discussed herein are related to a radio communication apparatus, a radio communication system, and a transmission method.

BACKGROUND

In the current networks, traffic of mobile terminals (smartphones or feature phones) occupies most of network resources. Furthermore, traffic used by mobile terminals tends to be continuously increased in the future.

In contrast, with the development of Internet of things (IoT) services (for example, transportation systems, smart meters, monitoring systems of devices or the like), there is a need to cope with services having various request conditions. Thus, in communication standards of 5G (fifth generation mobile unit communication), in addition to the technology of fourth generation mobile unit communication (4G), there is a demand for a technology that implements high-data-rate, high-capacity, and low-latency communication.

As described above, in 5G, in order to respond various kinds of services, support of a lot of use cases classified into eMBB (enhanced mobile broadband), Massive MTC (machine type communications), and URLLC (ultra-reliable and low latency communication) is conceived.

From among the use cases described above, URLLC is the most difficult use case to be implemented. First, there are demands of the error rate of $10^{-5}$ in a radio section, which is ultrahigh reliable communication. As a method of implementing ultrahigh reliability, there is a method for increasing an amount of resources to be used and providing redundancy to data. However, because an amount of radio resources is limited, it is not possible to increase the resources to be used without any limitation.

In addition, regarding a low latency, in URLLC, the aim of a delay in a radio section in a user plane in an uplink and a downlink is 0.5 milliseconds. This is a high request corresponding to less than 1/10 of 4G radio system Long Term Evolution (LTE). In URLLC, there is a need to simultaneously satisfy the above described two requests, i.e., ultrahigh reliability and low latency.

Furthermore, in 5G, there is a need to simultaneously support ultrahigh reliability and low latency communication data (URLLC data) and other data (for example, eMBB data, or the like) by using the same carrier, and thus, in order to implement this, it is desirable not to impair the efficiency of using frequency.

Some resource allocation methods for providing an URLLC service and another service (for example, an eMBB service, or the like) in a compatible manner have been proposed. As one of the proposed methods, there is an allocation method using a resource separation type that separates resources to be allocated to URLLC data from resources to be allocated to other pieces of data and reserves the resources regardless of whether URLLC data is present. In the allocation method using the resource separation type, because a data area used for the URLLC data is previously reserved, it is possible to always allocate a resource to the generated URLLC data. However, if there is no URLLC data to be transmitted, the resource that has been reserved for the URLLC data is not used; therefore, the efficiency of using the resource is degraded.

Furthermore, as another method, there is a proposed allocation method using a resource sharing type that shares the resources by the URLLC data and other pieces of data without separating the resources and transmitting, if URLLC data is generated, the URLLC data with priority by performing resource allocation for interrupting the URLLC data to the resource that has already been scheduled for another piece of data. In the resource sharing type, because a resource can be used for another piece of data in a case where URLLC data is not transmitted, the efficiency of using the resources is higher than that of the resource separation type.

Patent Document 1: Japanese Laid-open Patent Publication No. 2016-158304

Patent Document 2: Japanese Laid-open Patent Publication No. 2013-247513

Non-Patent Document 1: "New SID Proposal: Study on New Radio Access Technology", NTT docomo, RP-160671, 3GPP TSG RAN Meeting #71, Goteborg, Sweden, $7^{th}$-$10^{th}$ Mar. 2016

Non-Patent Document 2: 3GPP TR 38.913 V0.3.0 (2016-03)

Non-Patent Document 3: "On co-existence of eMBB and URLLC", NTT docomo, R1-167391, 3GPP TSG RAN WG1 Meeting #86, Gothenburg, Sweden, $22^{nd}$-$26^{th}$ Aug. 2016

Incidentally, in the resource sharing type, if URLLC data is generated, the URLLC data is transmitted by allowing the URLLC data to take higher a priority than the other piece of data and interrupt into a predetermined URLLC interruption resource area. Thus, in downlink communication in which a single base station device transmits both of the URLLC data and the other data, it is relatively easy to implement the allocation method using the resource sharing type.

However, in uplink communication in which each of a plurality of user terminal devices transmits the URLLC data and the other data, because a generation status of the URLLC data in another user terminal device is unknown, it is difficult to provide an URLLC interruption resource area. Namely, the user terminal device that transmits the other data does not recognize whether URLLC data is generated in another user terminal device, it is difficult to determine whether the other data is to be transmitted by using all of the resources or whether a part of resource needs to be left for the URLLC data that is transmitted by the other user terminal device.

Consequently, in uplink communication, the allocation method using the resource separation type that reserves the resources to be used to transmit the URLLC data regardless of whether URLLC data is generated is used and thus, the resources to be used to transmit the other data is decreased. As a result, there is a problem in which throughput of the other data is decreased. In contrast, in downlink communication that uses the resource sharing type, if URLLC data is generated, puncturing is performed on the other data that has been allocated to the resource interrupted by the URLLC data. Namely, because a part of the other data is lost in the URLLC interruption resource area, communication quality of the other data is decreased.

SUMMARY

According to an aspect of an embodiment, a radio communication apparatus includes: a modulating unit that modulates data to be transmitted by being arranged in a first resource area of a radio signal; a first spreading modulation unit that performs, by using a code, spreading modulation on data to be transmitted by being arranged in a second resource area provided in the first resource area; a mapping unit that maps the data modulated by the modulating unit onto the first resource area and that maps the data subjected to the spreading modulation by the first spreading modulation unit onto the second resource area; and a transmitter that transmits a signal obtained by mapping performed by the mapping unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Furthermore, the present invention is not limited to the embodiments.

[a] First Embodiment

Figure 1:
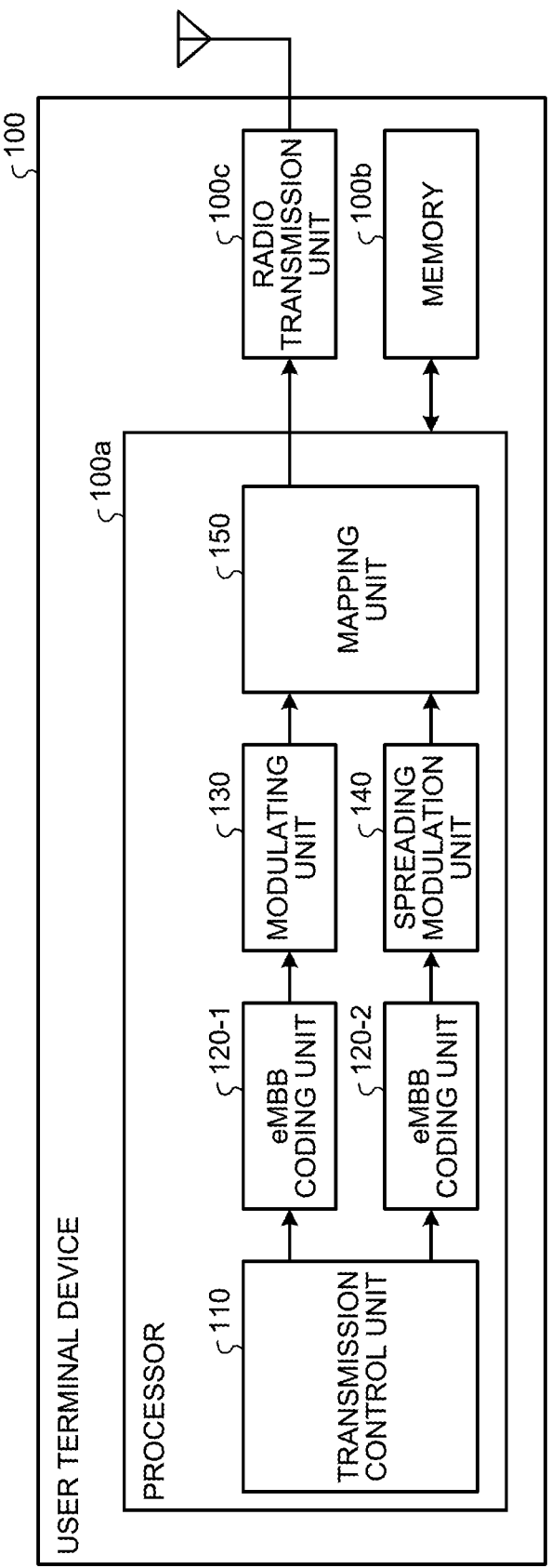
FIG. 1 is a block diagram illustrating a configuration of a user terminal device according to a first embodiment.

FIG. 1 is a block diagram illustrating a configuration of a user terminal device according to a first embodiment. A user terminal device 100 illustrated in FIG. 1 is, for example, a radio communication apparatus that transmits eMBB data including information, such as moving images, and includes a processor 100a, a memory 100b, and a radio transmission unit 100c.

The processor 100a includes, for example, a central processing unit (CPU), a field programmable gate array (FPGA), a digital signal processor (DSP), or the like and performs overall control of the user terminal device 100. Specifically, the processor 100a includes a transmission control unit 110, eMBB coding units 120-1 and 120-2, a modulating unit 130, a spreading modulation unit 140, and a mapping unit 150.

The transmission control unit 110 outputs eMBB data to the eMBB coding unit 120-1 or the eMBB coding unit 120-2 based on scheduling information on uplink transmission notified from the base station device. Specifically, if eMBB data is arranged in a resource area (hereinafter, referred to as a "multiplexing area") in which URLLC data that includes, for example, information that needs high reliability and low latency for an automatic operation is possibly be multiplexed with eMBB data, the transmission control unit 110 outputs the eMBB data to the eMBB coding unit 120-2. In contrast, if the eMBB data is not arranged in the multiplexing area, the transmission control unit 110 outputs the eMBB data to the eMBB coding unit 120-1. Namely, for example, in a resource area defined by the transmission time interval (TTI) having a predetermined time length and the frequency having a predetermined bandwidth, because a multiplexing area in which the URLLC data and the eMBB data are possibly be multiplexed is fixedly provided, the transmission control unit 110 switches the transmission destination of the eMBB data in accordance with whether the eMBB data is to be arranged in the multiplexing area.

The eMBB coding unit 120-1 encodes the eMBB data that is output from the transmission control unit 110. Then, the eMBB coding unit 120-1 outputs the encoded eMBB data to the modulating unit 130. The eMBB data output from the eMBB coding unit 120-1 is the eMBB data that is not arranged in the multiplexing area.

The eMBB coding unit 120-2 encodes the eMBB data that is output from the transmission control unit 110. Then, the eMBB coding unit 120-2 outputs the encoded eMBB data to the spreading modulation unit 140. The eMBB data output from the eMBB coding unit 120-2 is the eMBB data that is arranged in the multiplexing area. Furthermore, the coding rate in the eMBB coding units 120-1 and 120-2 may also be the same or may also be different.

The modulating unit 130 modulates the eMBB data that is not arranged in the multiplexing area. Namely, the modulating unit 130 modulates the pieces of eMBB data that are to be arranged other than the multiplexing area in each TTI.

The spreading modulation unit 140 performs spreading modulation, by using a code, the eMBB data that is to be arranged in the multiplexing area. Namely, the spreading modulation unit 140 performs spreading modulation on the eMBB data by using the code that is previously determined in order to spread the eMBB data. It is preferable that the code for spreading the eMBB data be orthogonal to a plurality of codes that are previously determined in order to spread the URLLC data. Because the code that is used to spread the eMBB data is orthogonal to the code that is used to spread the URLLC data, it is possible to reduce the interference between the eMBB data and the URLLC data.

The mapping unit 150 maps the eMBB data that has been modulated or that has been subjected to spreading modulation onto the TTI having a predetermined time length. Specifically, the mapping unit 150 arranges the eMBB data modulated by the modulating unit 130 in the area other than the multiplexing area in each TTI and performs mapping that arranges eMBB data that has been subjected to spreading modulation in the multiplexing area by the spreading modulation unit 140. The mapping unit 150 generates a transmission signal by mapping the eMBB data in this way.

The memory 100b includes, for example, a random access memory (RAM), a read only memory (ROM), or the like, and stores therein various kinds of information when a process is performed by the processor 100a.

The radio transmission unit 100c performs a radio transmission process of, for example, digital/analog (D/A) conversion, up-conversion, and the like, on the transmission signal output from the mapping unit 150. Then, the radio transmission unit 100c transmits the transmission signal via an antenna.

Figure 2:
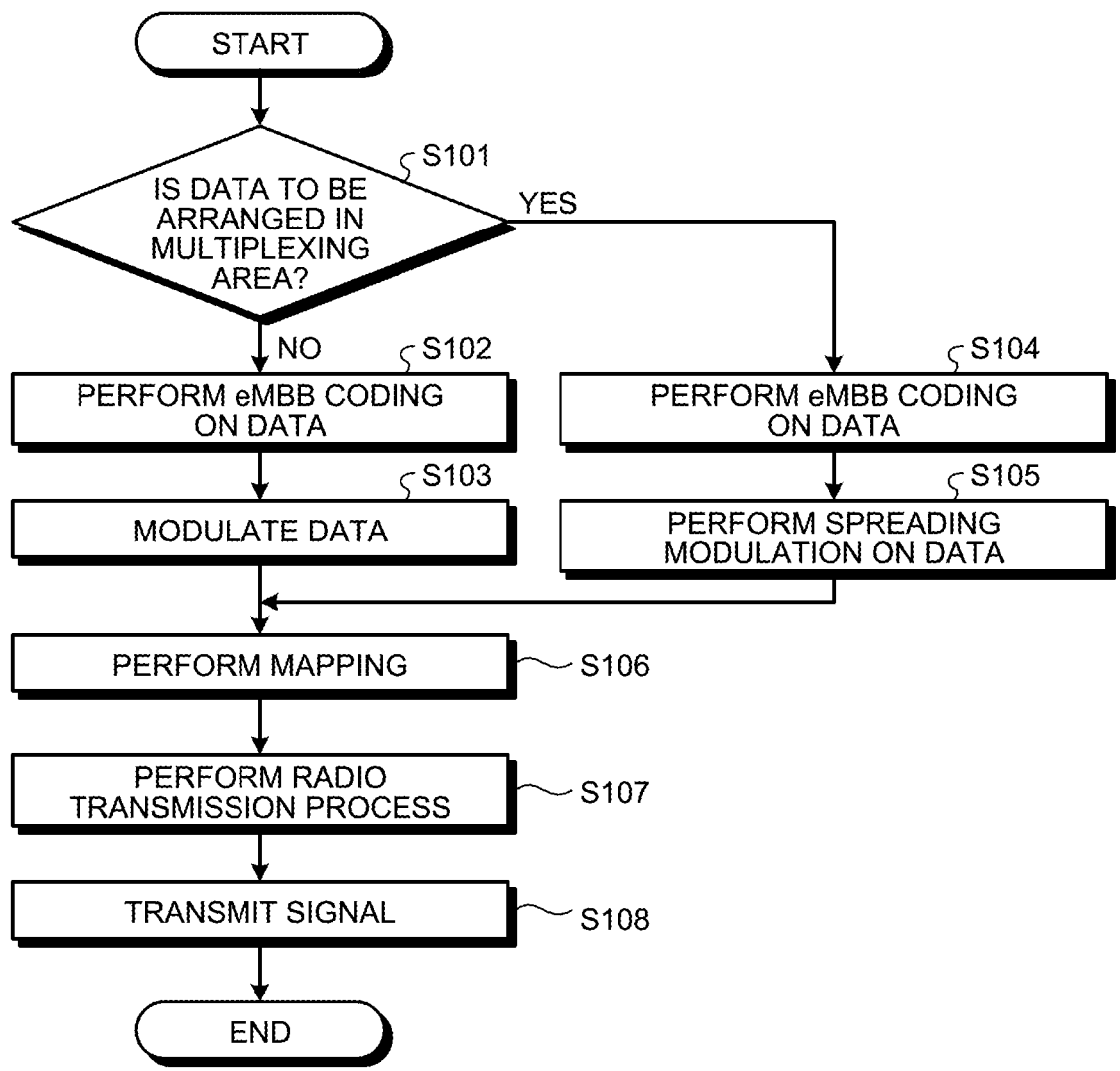
FIG. 2 is a flowchart illustrating a transmission method according to the first embodiment.

In the following, a transmission method performed by the user terminal device 100 having the configuration described above will be described with reference to the flowchart illustrated in FIG. 2.

If eMBB data is transmitted from the user terminal device 100 based on the scheduling information on the uplink transmission that is notified from the base station device, the eMBB data to be transmitted is generated by the transmission control unit 110 in the user terminal device 100. Then, it is determined, by the transmission control unit 110, whether the generated eMBB data is to be arranged in the multiplexing area (Step S101) and the eMBB data that is not arranged in the multiplexing area is output to the eMBB coding unit 120-1. Furthermore, the eMBB data to be arranged in the multiplexing area is output to the eMBB coding unit 120-2.

If the eMBB data is not arranged in the multiplexing area (No at Step S101), the eMBB data is encoded by the eMBB coding unit 120-1 (Step S102) and modulated by the modulating unit 130 (Step S103). Thus, the eMBB data that is arranged in the area other than the multiplexing area is encoded and modulated in a usual way.

In contrast, if the eMBB data is arranged in the multiplexing area (Yes at Step S101), the eMBB data is encoded by the eMBB coding unit 120-2 (Step S104) and is subjected to spreading modulation by the spreading modulation unit 140 (Step S105). Namely, the eMBB data arranged in the multiplexing area is encoded and is then subjected to spreading modulation by using a code. It is preferable that the code be orthogonal to the code that is used to spread the URLLC data. The eMBB data is spread by the code, which makes it possible to multiplex with the URLLC data that is spread by the other code.

Then, the eMBB data that has been modulated or that has been subjected spreading modulation is mapped to the resource by the mapping unit 150 (Step S106). Specifically, the eMBB data that has been spreading modulation is arranged in the multiplexing area that is fixedly provided in the resource of each TTI, whereas the modulated eMBB data is arranged in the area other than the multiplexing area. Because the eMBB data that has been subjected to spreading modulation by using the code is arranged in the multiplexing area, even if another user terminal device transmits, by using the resource of multiplexing area, the URLLC data subjected to spreading modulation by using the code, the eMBB data and the URLLC data can be separated on the reception side. Furthermore, for example, in the top area of the resource of each TTI, eMBB control information including information, such as a coding rate and a modulation scheme of the eMBB data, is mapped.

In this way, because the eMBB data that has been modulated or subjected to spreading modulation and the eMBB control information are mapped to the resource of each TTI, an uplink transmission signal is generated. The generated transmission signal is subjected to a predetermined radio transmission process by the radio transmission unit 100c (Step S107), and is then transmitted via the antenna (Step S108).

As described above, in the multiplexing area that is fixedly provided in the resource area, an uplink transmission signal in which the eMBB data that has been subjected to spreading modulation by using the code has been arranged is transmitted, thereby, it is possible to multiplex, in the multiplexing area, the eMBB data with the URLLC data that is transmitted from another user terminal device. Consequently, in also the case where the URLLC data is transmitted, the eMBB data is not lost, which makes it possible to reduce a decrease in throughput of the eMBB data.

Figure 3:
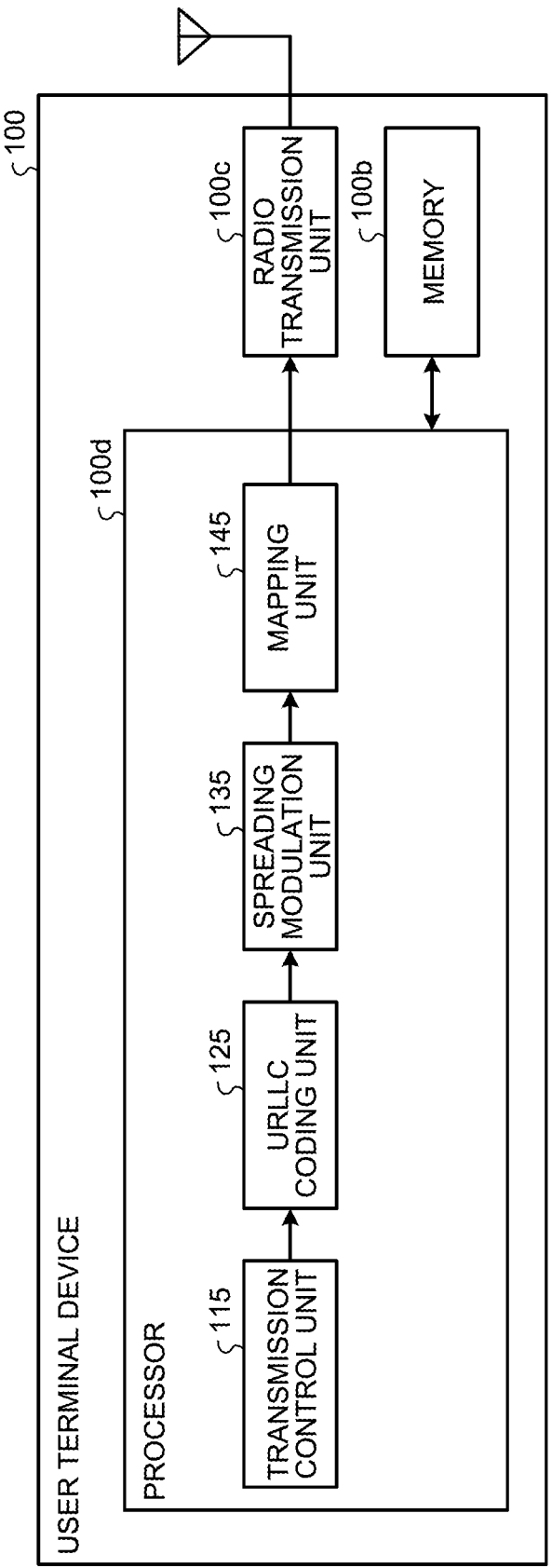
FIG. 3 is a block diagram illustrating a configuration of another user terminal device according to the first embodiment.

FIG. 3 is a block diagram illustrating a configuration of the other user terminal device 100 according to the first embodiment. In FIG. 3, components having the same configuration as those illustrated in FIG. 1 are assigned the same reference numerals and descriptions thereof will be omitted. The user terminal device 100 illustrated in FIG. 3 is a radio communication apparatus that transmits URLLC data and that includes a processor 100d, the memory 100b, and the radio transmission unit 100c.

The processor 100d includes, for example, a CPU, an FPGA, a DSP, or the like and performs overall control of the user terminal device 100. Specifically, the processor 100d includes a transmission control unit 115, a URLLC coding unit 125, a spreading modulation unit 135, and a mapping unit 145.

The transmission control unit 115 monitors whether URLLC data to be transmitted is generated and outputs, if the URLLC data has been generated, the URLLC data to the URLLC coding unit 125. The URLLC data is data that is irregularly generated having a relatively small size and that includes information transmitted and received used for, for example, an automatic operation or the like. Thus, the transmission control unit 115 monitors whether URLLC data is generated.

The URLLC coding unit 125 encodes the URLLC data output from the transmission control unit 115. Then, the URLLC coding unit 125 outputs the encoded URLLC data to the spreading modulation unit 135.

The spreading modulation unit 135 performs spreading modulation on the URLLC data by using the code. Namely, the spreading modulation unit 135 selects a single code from among the plurality of codes that are previously determined in order to spread the URLLC data and performs spreading modulation on the URLLC data by using the selected code. Each of the plurality of codes that are used to spread the URLLC data is preferably orthogonal to the code that is previously determined in order to spread the eMBB data. In contrast, the plurality of codes that are used to spread the URLLC data may also be non-orthogonal with each other. By allowing the plurality of codes that are used to spread the URLLC data to be non-orthogonal, it is possible to improve the multiplexing efficiency of the URLLC data.

The mapping unit 145 maps the URLLC data that has been subjected to spreading modulation on the TTI having a predetermined time length. Specifically, the mapping unit 145 performs mapping in which the URLLC data that has been subjected to spreading modulation by the spreading modulation unit 135 is arranged in the multiplexing area for each TTI. The mapping unit 145 generates a transmission signal by mapping the URLLC data in this way. Furthermore, data in order to implement low-latency transmission, the length of the TTI used for transmission of the URLLC data is set shorter than the length of the TTI used for transmission of the eMBB.

Figure 4:
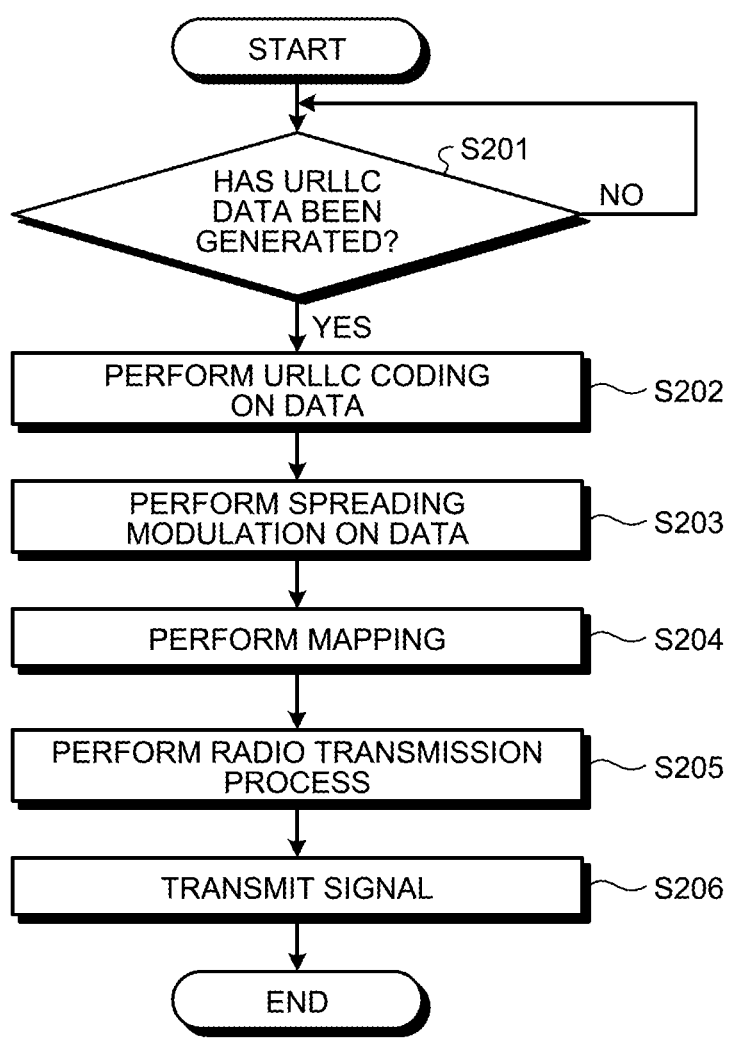
FIG. 4 is a flowchart illustrating another transmission method according to the first embodiment.

In the following, a transmission method performed by the user terminal device 100 having the configuration described above will be described with reference to the flowchart illustrated in FIG. 4.

If the user terminal device 100 is a user terminal device that transmits URLLC data by using an uplink, the transmission control unit 115 in the user terminal device 100 monitors whether URLLC data has been generated (Step S201). The monitoring is continued until URLLC data is generated (No at Step S201) and, if URLLC data is generated (Yes at Step S201), the URLLC data is output to the URLLC coding unit 125.

Then, the URLLC data is encoded by the URLLC coding unit 125 (Step S202) and is subjected to spreading modulation by the spreading modulation unit 135 (Step S203). Namely, after the URLLC data has been encoded, the spreading modulation is performed by using the single code that has been selected from among the plurality of codes. It is preferable that these codes be orthogonal to the code that is used to spread the eMBB data. The URLLC data is spread by the code, which makes it possible to multiplex with the eMBB data that is spread by another code.

Then, the URLLC data that has been subjected to the spreading modulation is mapped on the resource by the mapping unit 145 (Step S204). Specifically, the URLLC data subjected to the spreading modulation is arranged in the multiplexing area that is fixedly provided in the resource of each TTI. Because the URLLC data that has been subjected to the spreading modulation by using the code is arranged in the multiplexing area, even if another user terminal device transmits, by using the resource in the multiplexing area, the eMBB data and the URLLC data that have been subjected to the spreading modulation by using the code, it is possible to separate, on the reception side, the data received from each of the user terminal devices.

In this way, because the URLLC data subjected to the spreading modulation is mapped in the multiplexing area for each TTI, an uplink transmission signal is generated. The generated transmission signal is subjected to a predetermined radio transmission process performed by the radio transmission unit 100c (Step S205) and is then transmitted via the antenna (Step S206).

As described above, because the uplink transmission signal in which the URLLC data that has been subjected to the spreading modulation by using the code is arranged is transmitted to the multiplexing area that is fixedly provided in the resource area, it is possible to multiplex, in the multiplexing area, the URLLC data, and eMBB data and URLLC data transmitted from another user terminal device. Consequently, in also a case where the URLLC data is transmitted, it is possible to transmit the eMBB data using the multiplexing area and it is thus possible to suppress a decrease in throughput of the eMBB data.

Figure 5:
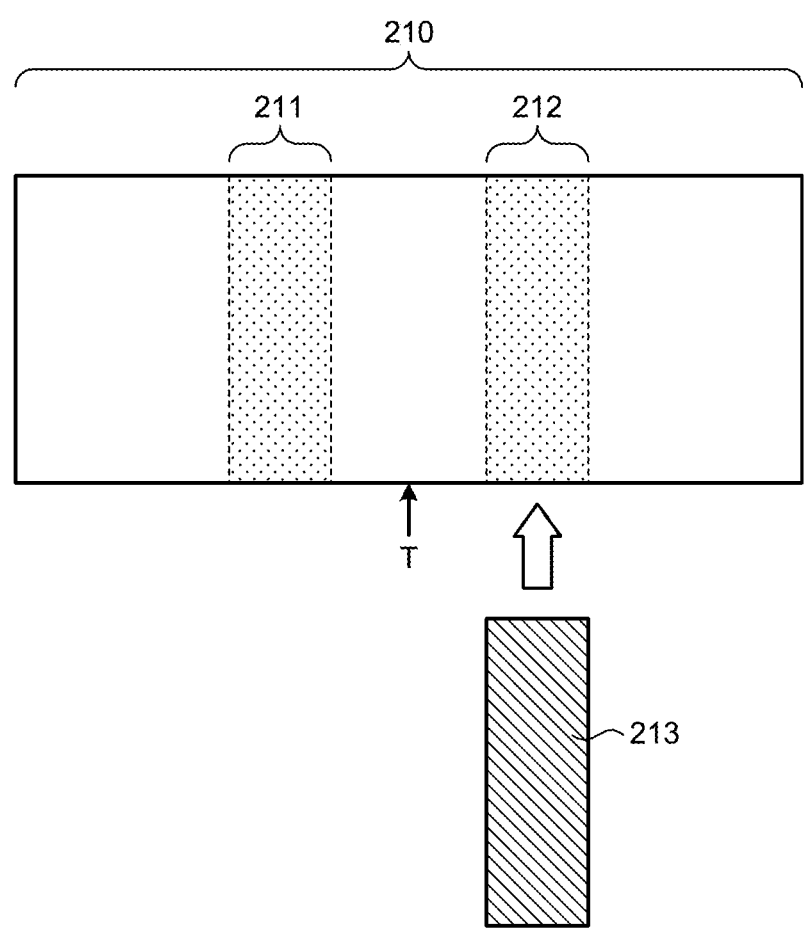
FIG. 5 is a diagram illustrating a specific example of TTI according to the first embodiment.

FIG. 5 is a diagram illustrating a specific example of the TTI according to the first embodiment. As illustrated in FIG. 5, a single TTI has a resource area 210 (hereinafter, referred to as an "eMBB data area") in which eMBB data is mapped. Then, in the eMBB data area 210, multiplexing areas 211 and 212 in each of which the eMBB data and the URLLC data can be multiplexed are provided. The user terminal device 100 that transmits the eMBB data maps, based on the scheduling information on the uplink transmission notified by the base station device, the eMBB data onto the eMBB data area 210. However, the user terminal device 100 maps the eMBB data that has been subjected to spreading modulation by using the code onto the multiplexing areas 211 and 212 in the eMBB data area 210.

In contrast, the user terminal device 100 that transmits the URLLC data monitors whether URLLC data has been generated and performs, if URLLC data is generated at, for example, time T, spreading modulation on URLLC data 213 by using the code. Then, the user terminal device 100 maps the URLLC data 213 subjected to the spreading modulation onto the multiplexing area 212 positioned after the time T. In this way, if the URLLC data 213 is generated, the eMBB data and the URLLC data 213 are multiplexed in the immediately subsequent multiplexing area. Consequently, it is possible to implement low-latency transmission of the URLLC data and it is thus possible to suppress a decrease in throughput of the eMBB data.

Figure 6:
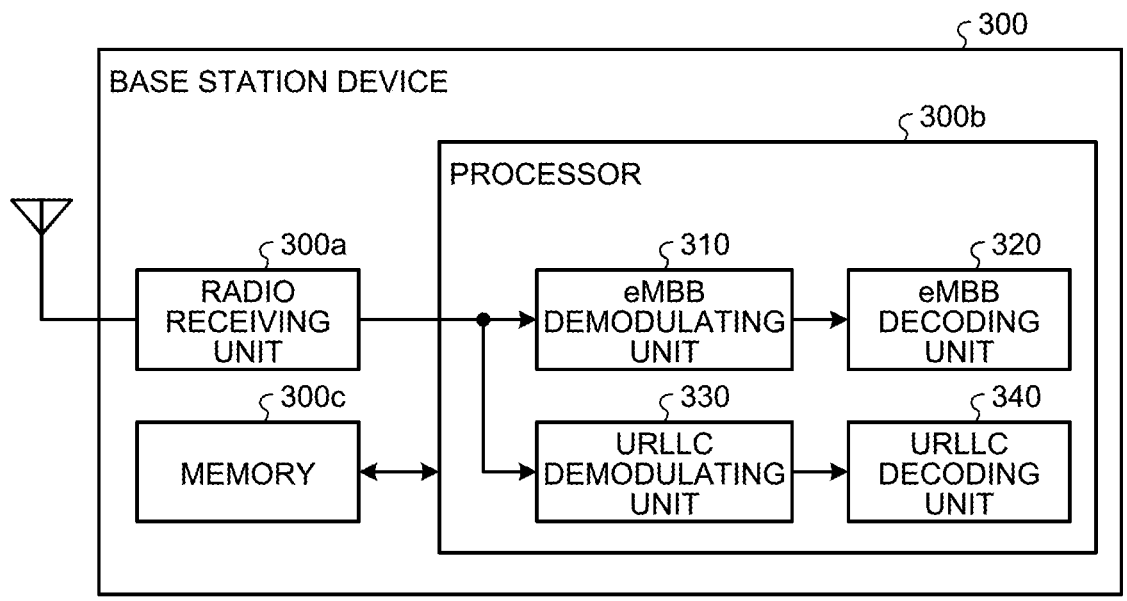
FIG. 6 is a block diagram illustrating a configuration of a base station device according to the first embodiment.

In the following, a configuration of a base station device that receives an uplink signal will be described. FIG. 6 is a block diagram illustrating a configuration of a base station device 300 according to the first embodiment. The base station device 300 illustrated in FIG. 6 is a radio communication apparatus that receives the eMBB data and the URLLC data transmitted from each of the user terminal devices 100 and that includes a radio receiving unit 300a, a processor 300b, and a memory 300c.

The radio receiving unit 300a receives a signal via an antenna and performs a radio reception process of, for example, down-conversion, analog/digital (A/D) conversion, or the like on the reception signal. Then, the radio receiving unit 300a outputs the reception signal to the processor 300b.

The processor 300b includes, for example, a CPU, an FPGA, a DSP, or the like and performs overall control of the base station device 300. Specifically, the processor 300b includes an eMBB demodulating unit 310, an eMBB decoding unit 320, an URLLC demodulating unit 330, and an URLLC decoding unit 340.

Based on the scheduling information on the uplink transmission notified to the user terminal device that transmits the eMBB data, the eMBB demodulating unit 310 demodulates the eMBB data map in the eMBB data area of the reception signal. At this time, regarding the eMBB data area other than the multiplexing area, the eMBB demodulating unit 310 demodulates the eMBB data in accordance with the modulation scheme included in the scheduling information. Furthermore, regarding the multiplexing area, the eMBB demodulating unit 310 performs despreading by using the code that has been used to spread the eMBB data and demodulates the eMBB data.

The eMBB decoding unit 320 decodes the eMBB data that has been demodulated by the eMBB demodulating unit 310. Consequently, the eMBB decoding unit 320 can acquire the eMBB data transmitted by using the entire of the eMBB data area that includes the multiplexing area.

The URLLC demodulating unit 330 demodulates the URLLC data that has been mapped onto the multiplexing area included in the eMBB data area used for the reception signal. At this time, the URLLC demodulating unit 330 performs despreading by sequentially using each of the plurality of codes that are possibly used to spread the URLLC data and demodulates the URLLC data. Namely, because the URLLC data is irregularly generated data, in the multiplexing area, there may be a case in which the eMBB data and the URLLC data have been multiplexed and mapped and a case in which only the eMBB data has been mapped. Furthermore, the URLLC data is subjected to spreading modulation by using a single code out of the plurality of codes. Thus, the URLLC demodulating unit 330 performs despreading on the multiplexing area by using each of the codes that are used to spread the URLLC data and demodulates all of the pieces of the URLLC data that have been mapped to the multiplexing area.

The URLLC decoding unit 340 decodes the URLLC data that has been demodulated by the URLLC demodulating unit 330. Consequently, the URLLC decoding unit 340 can acquire the URLLC data that has been multiplexed with the eMBB data in the multiplexing area.

As described above, according to the embodiment, the user terminal device that transmits the eMBB data maps the eMBB data that has been subjected to spreading modulation by using the code onto the multiplexing area that is fixedly provided inside the resource in which the eMBB data is arranged. Furthermore, the user terminal device that transmits the URLLC data maps, if URLLC data is generated, the URLLC data that has been subjected to spreading modulation by using the code onto the multiplexing area. Consequently, even if the URLLC data is generated, because the eMBB data and the URLLC data are multiplexed in the multiplexing area, the eMBB data is not removed and it is thus possible to suppress a decrease in throughput of the eMBB data while maintaining the quality of the URLLC data.

Figure 7:
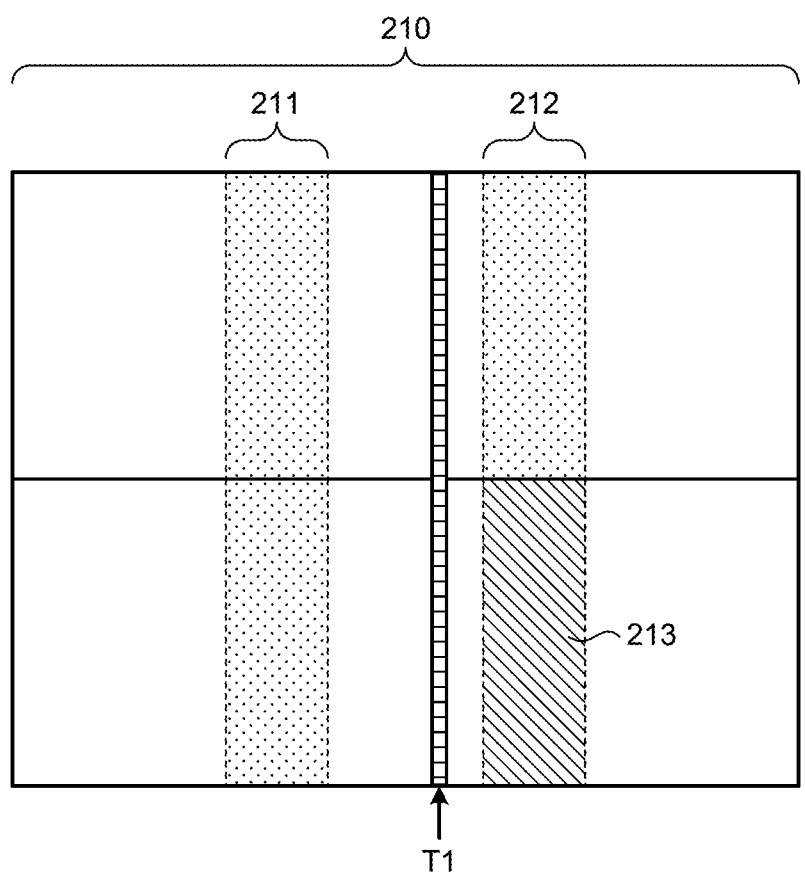
FIG. 7 is a diagram illustrating a resource selection method.

Furthermore, in the first embodiment described above, it is assumed that the URLLC data is mapped to the multiplexing area positioned immediately after the time at which the URLLC data has been generated; however, if a plurality of multiplexing areas are present in the frequency direction, the URLLC data may also be mapped by selecting one of the multiplexing areas. Specifically, for example, as illustrated in FIG. 7, in a case where the eMBB data area 210 corresponds to a single TTI in the time direction and corresponds to a plurality of unit bandwidths in the frequency direction, it may also be possible to select which resource of the unit bandwidth included in the multiplexing area is to be used to map the URLLC data. For example, if the URLLC data 213 is mapped to the multiplexing area 212, the received power for each unit bandwidth may also be measured at the timing T1 positioned immediately before the multiplexing area 212 and then, the URLLC data 213 may also be mapped to the resource having the unit bandwidth in which the received power is the smallest.

In this way, by measuring the received power for each unit bandwidth at the time positioned immediately before the multiplexing area, it is possible to determine the unit bandwidth that is not used by another user terminal device or in which interference due to the eMBB data is the smallest. Then, by mapping the URLLC data onto the resource having this type of unit bandwidth, interference due to the eMBB data is decreased and, on the reception side, it is possible to improve the accuracy of the demodulation of the URLLC data.

Figure 8:
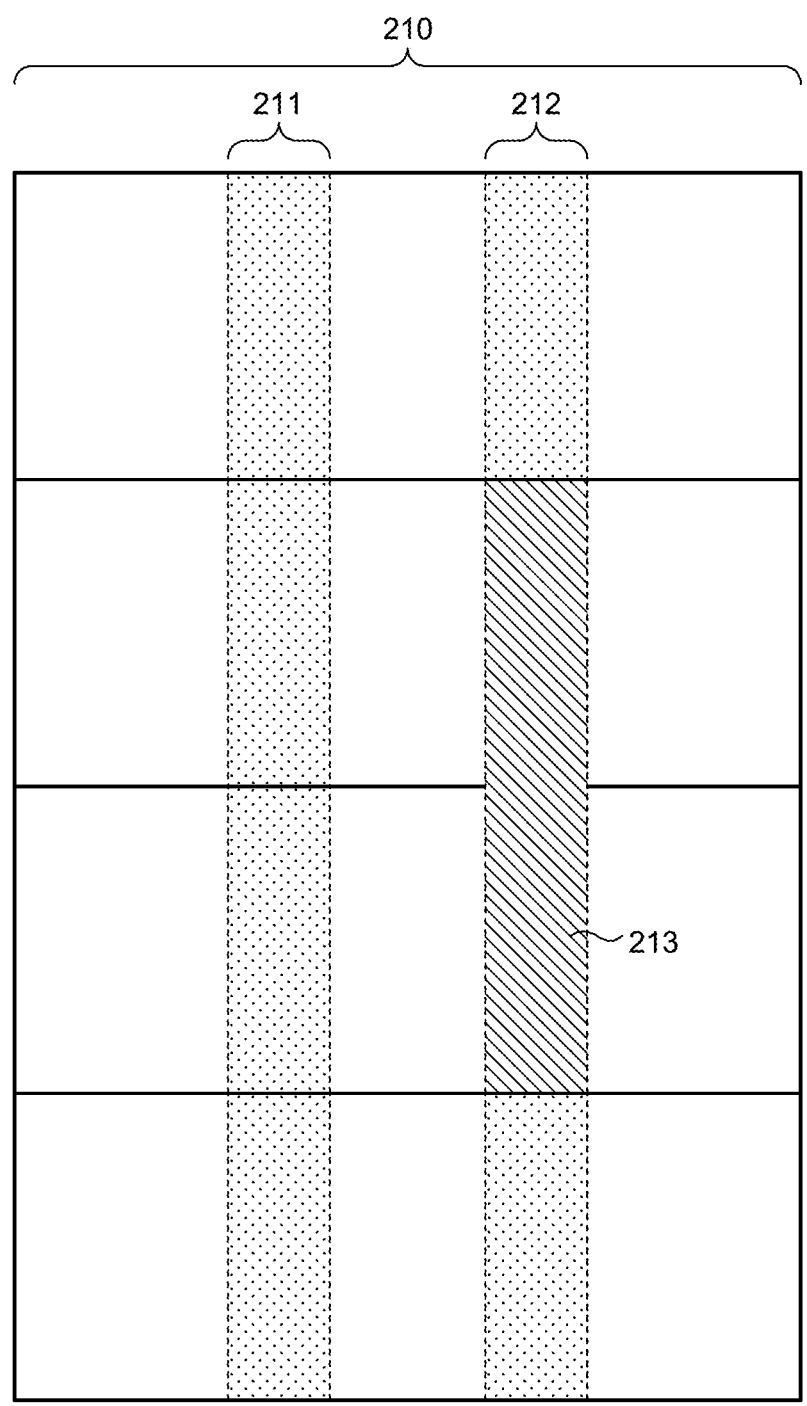
FIG. 8 is a diagram illustrating another resource selection method.

Furthermore, if a plurality of unit bandwidths is included in the multiplexing area, the URLLC data may also be mapped onto the resource that is located across the plurality of unit bandwidths. Namely, for example, as illustrated in FIG. 8, if the multiplexing area 212 included in the eMBB data area 210 includes four unit bandwidths, the URLLC data may also be mapped onto the resources of the two unit bandwidths. In this case, because the resource in which the URLLC data is mapped is increased, it may also be possible to increase the spreading rate by increasing the size of the code that is used to perform spreading modulation on the URLLC data or it may also be possible to decrease the coding rate of the URLLC data. Consequently, it is possible to decrease the error rate of the URLLC data on the reception side and it is thus possible to improve the reliability.

[b] Second Embodiment

The characteristic of a second embodiment is that the eMBB data and the URLLC data are subjected to code multiplex in the multiplexing area in the downlink that is lead from the base station device toward the user terminal device.

Figure 9:
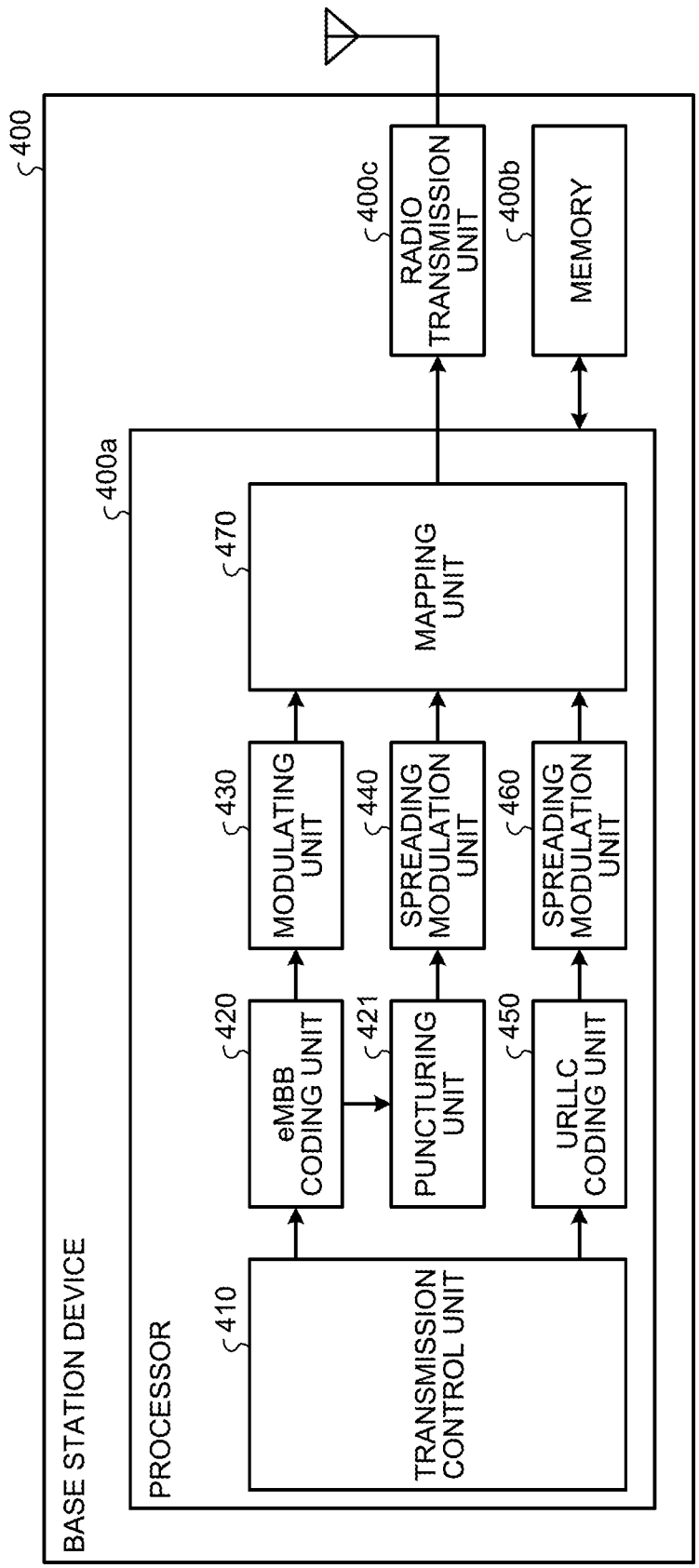
FIG. 9 is a block diagram illustrating a configuration of a base station device according to a second embodiment.

FIG. 9 is a block diagram illustrating a configuration of a base station device 400 according to the second embodiment. The base station device 400 illustrated in FIG. 9 is a radio communication apparatus that transmits the eMBB data and the URLLC data and that includes a processor 400*a*, a memory 400*b*, and a radio transmission unit 400*c*.

A transmission control unit 410 performs scheduling related to transmission of the eMBB data and outputs the eMBB data to an eMBB coding unit 420 in accordance with the result of the scheduling. Furthermore, the transmission control unit 410 monitors whether the URLLC data has been generated and outputs, if the URLLC data has been generated, the URLLC data to an URLLC coding unit 450. Then, if the URLLC data has been generated, the transmission control unit 410 instructs each of a puncturing unit 421 and a spreading modulation unit 440 so as to performing puncturing and spreading modulation on the eMBB coding data that is to be mapped to the multiplexing area in which the URLLC data is multiplexed.

The eMBB coding unit 420 encodes the eMBB data output from the transmission control unit 410. Then, the eMBB coding unit 420 outputs the encoded eMBB data to a modulating unit 430.

After having puncturing on the eMBB data that is to be mapped onto the multiplexing area, the puncturing unit 421 outputs the eMBB data to the spreading modulation unit 440. The puncturing rate in the puncturing unit 421 may also be determined in accordance with, for example, the number of pieces of generated URLLC data. Namely, as the number of pieces of URLLC data that are generated and are to be multiplexed with the eMBB data is increased, the eMBB data may also be punctured such that a greater number of bits may also be removed.

The modulating unit 430 modulates the eMBB data that is not multiplexed with the URLLC data. Namely, the modulating unit 430 modulates the eMBB data in a case where the URLLC data is not generated.

The spreading modulation unit 440 performs, by using a code, spreading modulation on the eMBB data that is to be multiplexed with the URLLC data. Namely, the spreading modulation unit 440 performs spreading modulation on the eMBB data by using the code that is previously determined in order to spread the eMBB data. It is preferable that the code that is used to spread the eMBB data be orthogonal to a plurality of codes that are previously determined in order to spread the URLLC data. Because the code that is used to spread the eMBB data or orthogonal to the code that is used to spread the URLLC data, it is possible to reduce the interference between the eMBB data and the URLLC data. Furthermore, the code that is used to spread the eMBB data may also have a spreading rate that is in accordance with, for example, the number of pieces of generated URLLC data. Namely, it may also be possible to change the spreading rate of the code that is used to spread the eMBB data in accordance with the number of pieces of the URLLC data to be multiplexed with the eMBB data.

The URLLC coding unit 450 encodes the URLLC data output from the transmission control unit 410. Then, the URLLC coding unit 450 outputs the encoded URLLC data to a spreading modulation unit 460.

The spreading modulation unit 460 performs spreading modulation on the URLLC data by using the code. Namely, the spreading modulation unit 460 selects a single code different for each transmission destination from among the plurality of codes that are previously determined in order to spread the URLLC data and then performs spreading modulation on the URLLC data for each transmission destination by using the selected code. It is preferable that all of the plurality of codes that are used to spread the URLLC data be orthogonal to the code that is previously determined in order to spread the eMBB data. In contrast, the plurality of codes that are used to spread the URLLC data may also be non-orthogonal with each other. By allowing the plurality of codes that are used to spread the URLLC data to be non-orthogonal, it is possible to improve the multiplexing efficiency of the URLLC data.

A mapping unit 470 maps the eMBB data, the URLLC data, and the control information on the TTI having a predetermined time length. Namely, the mapping unit 470 maps eMBB control information that indicates information, such as the coding rate and the modulation scheme of the eMBB data, and the eMBB data that is output from the modulating unit 430 onto the resource for each TTI. Then, the mapping unit 470 maps, onto the multiplexing area provided at a predetermined position in the resource area in which the eMBB data is to be mapped, the URLLC control information that indicates whether the eMBB data and the URLLC data have been multiplexed in the multiplexing area. Furthermore, in a case where the URLLC data is generated, the mapping unit 470 multiplexes the eMBB data output from the spreading modulation unit 440 and the URLLC data output from the spreading modulation unit 460 and maps the multiplexed data onto the multiplexing area. In this way, the mapping unit 470 generates the transmission signal by mapping the eMBB control information, the eMBB data, the URLLC control information, and the URLLC data onto the resource for each TTI.

The memory 400b includes, for example, a RAM, a ROM, or the like and stores various kinds of information when a process is performed by the processor 400a.

The radio transmission unit 400c performs the radio transmission process of, for example, D/A conversion, up-conversion, or the like, on the transmission signal that is output from the mapping unit 470. Then, the radio transmission unit 400c transmits the transmission signal via an antenna.

Figure 10:
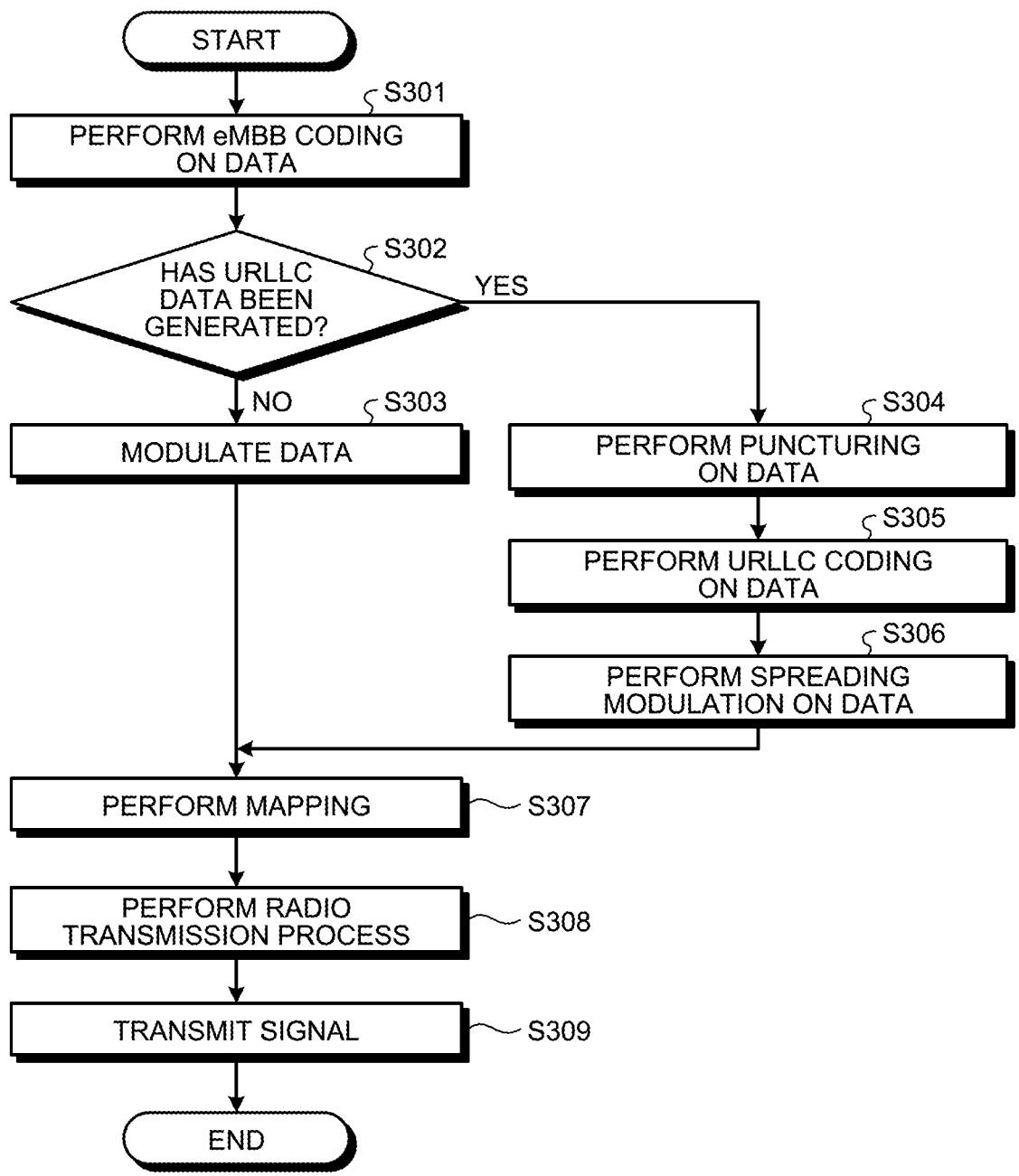
FIG. 10 is a flowchart illustrating a transmission method according to the second embodiment.

In the following, a transmission method performed by the base station device 400 having the configuration described above will be described with reference to the flowchart illustrated in FIG. 10.

When the base station device 400 transmits data to the user terminal device via a downlink, the eMBB data is output from the transmission control unit 410 to the eMBB coding unit 420 and is encoded at the coding rate that is determined by the scheduling (Step S301). Furthermore, the transmission control unit 410 always monitors whether URLLC data to be transmitted is generated (Step S302). If the URLLC data is not generated (No at Step S302), the encoded eMBB data is modulated by the modulating unit 430 (Step S303).

If the URLLC data to be transmitted is generated (Yes at Step S302), the eMBB data to be multiplexed with the URLLC data is output to the puncturing unit 421 and a removal is performed at the puncturing rate that has been determined by the scheduling (Step S304).

Furthermore, the generated URLLC data is output to the URLLC coding unit 450 and is encoded (Step S305). Then, the punctured eMBB data and the encoded URLLC data are subjected to spreading modulation by using different codes (Step S306). Namely, the eMBB data that has been punctured by the spreading modulation unit 440 is subjected to spreading modulation and the URLLC data that has been encoded by the spreading modulation unit 460 is subjected to spreading modulation. It is preferable that the codes that are used to spread the eMBB data and the URLLC data be orthogonal with each other. In contrast, if a plurality of pieces of URLLC data is subjected to spreading modulation, each of the codes that are used to spread the pieces of URLLC data may also be non-orthogonal with each other.

Then, both of the eMBB data that has been modulated or subjected to spreading modulation and the URLLC data that has been subjected to spreading modulation are mapped onto the resource by the mapping unit 470 (Step S307). Specifically, if the URLLC data is not generated, the eMBB data that has been modulated by the modulating unit 430 is arranged in the eMBB data area that includes the multiplexing area that has been fixedly provided in the resource for each TTI. In contrast, if the URLLC data has been generated, the eMBB data that has been subjected to spreading modulation by the spreading modulation unit 440 and the URLLC data that has been subjected to spreading modulation by the spreading modulation unit 460 are arranged in the multiplexing area that is positioned immediately after the URLLC data was generated.

In this way, in the multiplexing area, because the eMBB data and the URLLC data that have been subjected to spreading modulation by using the code are multiplexed, the user terminal device at the transmission destination can acquire, by performing despreading on the multiplexing area, the eMBB data or the URLLC data addressed to the own device.

Furthermore, for example, at the top area of the resource for each TTI, eMBB control information including the information, such as the coding rate and the modulation scheme of the eMBB data, is mapped. Then, in each of the multiplexing areas, the URLLC control information indicating whether the eMBB data and the URLLC data are multiplexed in the subject multiplexing area is mapped. Based on the URLLC control information that is mapped to each of the multiplexing areas, the user terminal device at the transmission destination can determine whether the URLLC data is included in the multiplexing area and correctly demodulate the eMBB data or the URLLC data in the multiplexing area.

In this way, because the eMBB data, the URLLC data, the eMBB control information, and the URLLC control information are mapped to the resource for each TTI, a downlink transmission signal is generated. The generated transmission signal is subjected to a predetermined radio transmission process by the radio transmission unit 400c (Step S308) and is then transmitted via the antenna (Step S309).

Figure 11:
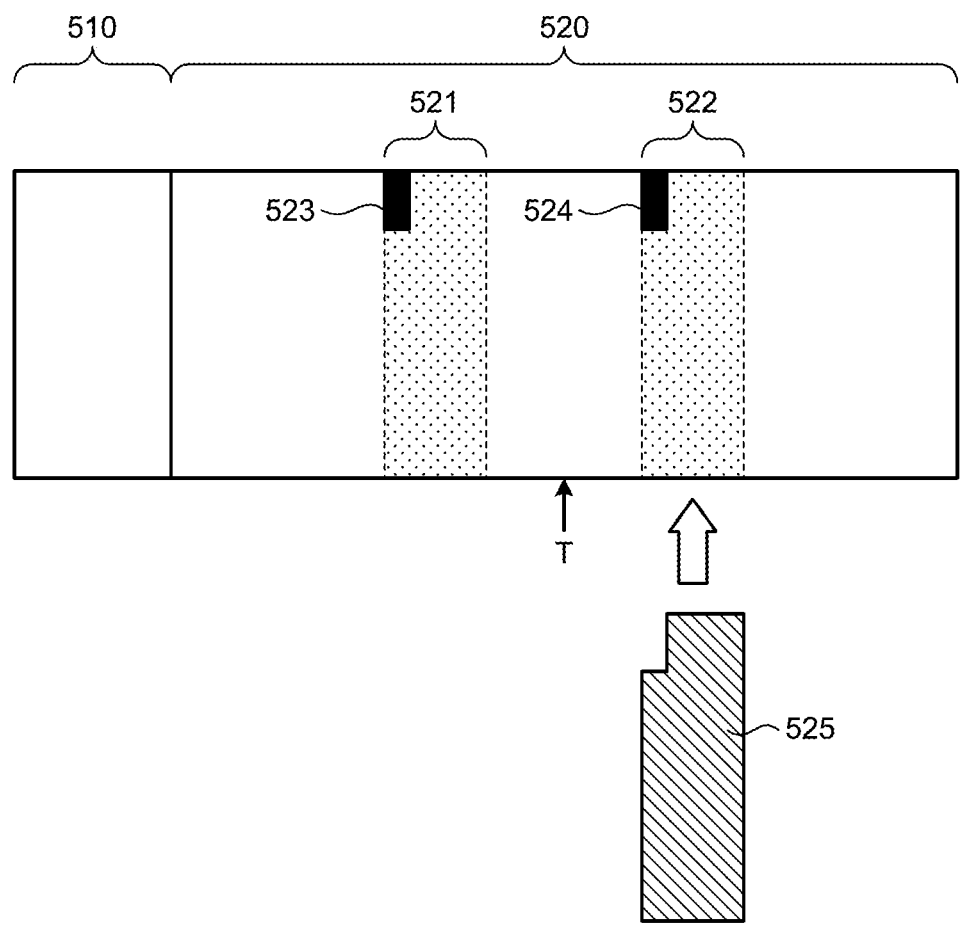
FIG. 11 is a diagram illustrating a specific example of TTI according to the second embodiment.

FIG. 11 is a diagram illustrating a specific example of the TTI according to the second embodiment. As illustrated in FIG. 11, a single TTI includes an eMBB control area 510 in which the eMBB control information is mapped and an eMBB data area 520 in which the eMBB data is mapped. Then, in the eMBB data area 520, the multiplexing areas 521 and 522 that are capable of multiplexing the eMBB data and the URLLC data are provided. The base station device 400 maps the eMBB control information onto the eMBB control area 510 and maps the eMBB data onto the eMBB data area 520. However, the base station device 400 maps URLLC control information 523 and 524 onto the multiplexing areas 521 and 522, respectively, and sends a notification that the URLLC data is multiplexed with the eMBB data in each of the multiplexing areas 521 and 522.

In the example illustrated in FIG. 11, for example, because the URLLC data is generated at time T, the URLLC control information 523 indicating that the URLLC data and the eMBB data are not multiplexed is mapped to the multiplexing area 521 that is positioned before the generation of the URLLC data. Then, the eMBB data that is the same as that in the area other than the multiplexing area is mapped in the multiplexing area 521. In contrast, in the multiplexing area 522 positioned immediately after the generation of the URLLC data, the URLLC control information 524 indicating that the URLLC data and the eMBB data are multiplexed is mapped. Then, in the multiplexing area 522, the eMBB data and URLLC data 525 each of which has been subjected to spreading modulation are multiplexed.

As described above, according to the embodiment, if the URLLC data is not generated, the base station device arranges the eMBB data in the entire of the eMBB data area including the multiplexing area and, if the URLLC data is generated, in the multiplexing area included in the eMBB data area, the base station device multiplexes the eMBB data and the URLLC data that have been subjected to spreading modulation. Consequently, in a case where the URLLC data is not generated, it is possible to transmit the eMBB data by using the resource in the multiplexing area and in a case where the URLLC data has been generated, it is possible to transmit the eMBB data and the URLLC data by using the resource in the multiplexing area. Consequently, it is possible to suppress a decrease in throughput of the eMBB data in also the case in which the URLLC data is transmitted while efficiently using the resource in the multiplexing area.

[c] Third Embodiment

The characteristic of a third embodiment is that a notification indicating whether the URLLC data is present is eliminated by mapping the eMBB data that has been subjected to spreading modulation onto the multiplexing area regardless of whether URLLC data has been generated.

Figure 12:
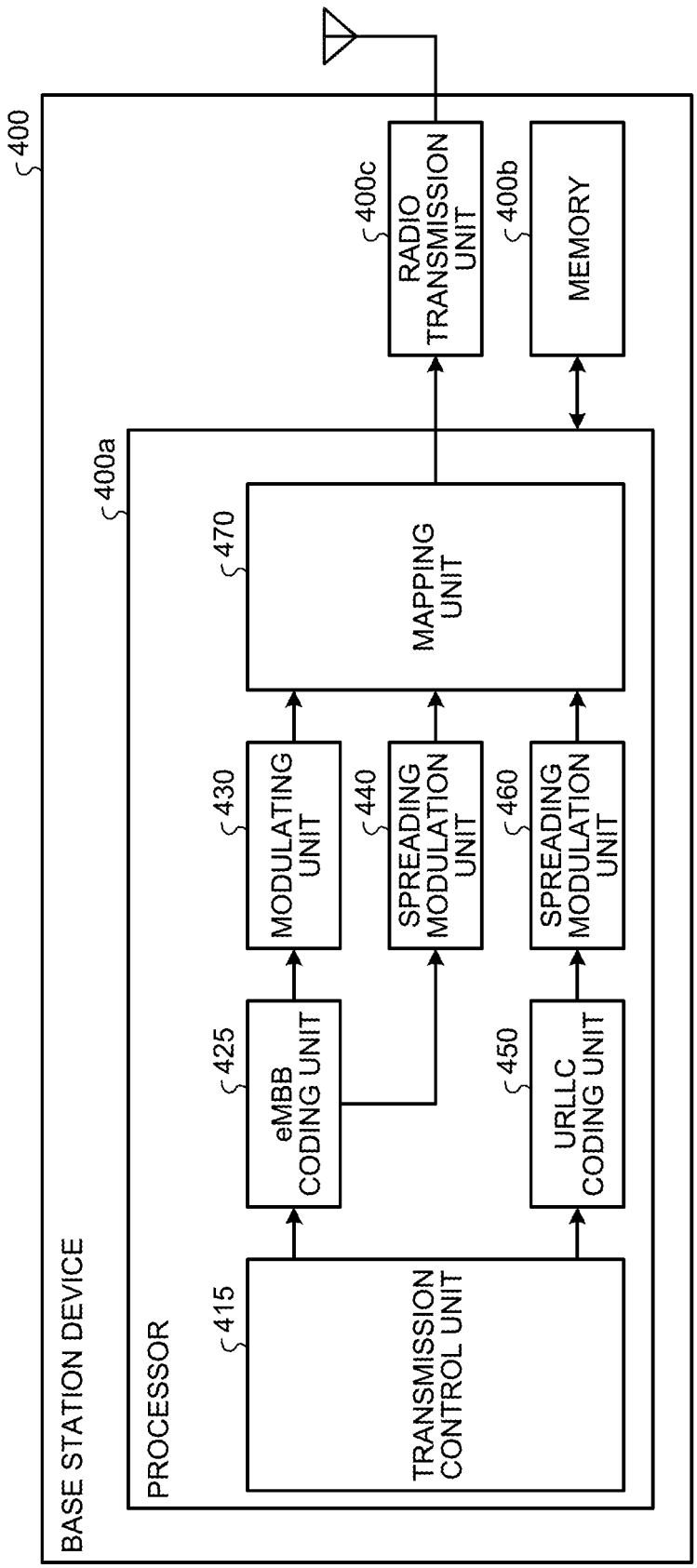
FIG. 12 is a block diagram illustrating a configuration of a base station device according to a third embodiment.

FIG. 12 is a block diagram illustrating a configuration of the base station device 400 according to a third embodiment. In FIG. 12, components having the same configuration as those illustrated in FIG. 9 are assigned the same reference numerals and descriptions thereof will be omitted. The base station device 400 illustrated in FIG. 12 includes a transmission control unit 415 and an eMBB coding unit 425 instead of the transmission control unit 410 and the eMBB coding unit 420, respectively, included in the base station device 400 illustrated in FIG. 9 and has a configuration in which the puncturing unit 421 is deleted.

The transmission control unit 415 performs scheduling related to transmission of the eMBB data and outputs the eMBB data to the eMBB coding unit 425 in accordance with the result of the scheduling. At this time, the transmission control unit 415 sets the eMBB data that is arranged in the multiplexing area such that the eMBB data is output at a rate lower than that of the eMBB data that is not arranged in the multiplexing area. This is because that the eMBB data arranged in the multiplexing area is subjected to spreading modulation regardless whether the eMBB data is multiplexed with the URLLC data. Furthermore, the transmission control unit 415 monitors whether the URLLC data has been generated and output, if the URLLC data has been generated, the URLLC data to the URLLC coding unit 450.

The eMBB coding unit 425 encodes the eMBB data that is output from the transmission control unit 415. Then, the eMBB coding unit 425 outputs the eMBB data that is not arranged in the multiplexing area to the modulating unit 430 and outputs the eMBB data that is arranged in the multiplexing area to the spreading modulation unit 440.

Figure 13:
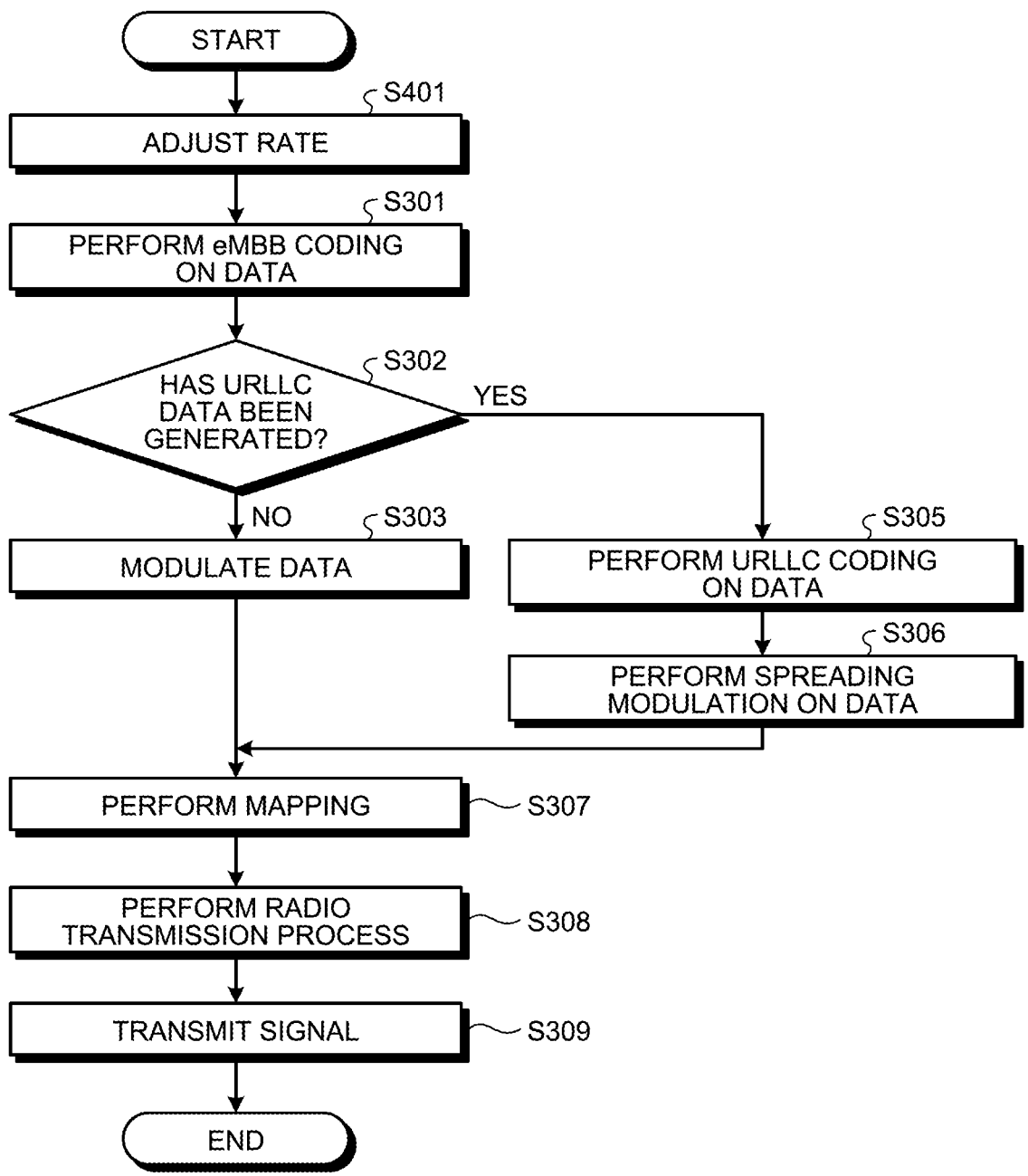
FIG. 13 is a flowchart illustrating a transmission method according to the third embodiment.

In the following, the transmission method performed by the base station device 400 having the configuration described above will be described with reference to the flowchart illustrated in FIG. 13. In FIG. 13, components having the same configuration as those illustrated in FIG. 10 are assigned the same reference numerals and descriptions thereof in detail will be omitted.

When the base station device 400 transmits data to the user terminal device via a downlink, the rate adjustment of the eMBB data is performed by the transmission control unit 415 in the base station device 400 based on whether the eMBB data is arranged in the multiplexing area (Step S401). Namely, the eMBB data that is not arranged in the multiplexing area is adjusted so as to be output to the modulating unit 430 at a predetermined rate, whereas the eMBB data that is arranged in the multiplexing area is adjusted so as to be output the spreading modulation unit 440 at the rate lower than the predetermined rate.

Furthermore, the eMBB data is output to the eMBB coding unit 425 by the transmission control unit 415 and is encoded at the coding rate that has been determined by the scheduling (Step S301). In contrast, the transmission control unit 415 always monitors whether the URLLC data to be transmitted has been generated (Step S302). If the URLLC data is not generated (No at Step S302), the eMBB data that is not arranged in the multiplexing area is modulated by the modulating unit 430 (Step S303). Furthermore, in also a case in which the URLLC data is not generated, the eMBB data to be arranged in the multiplexing area is subjected to spreading modulation by the spreading modulation unit 440.

If the URLLC data to be transmitted has been generated (Yes at Step S302), the generated URLLC data is output to the URLLC coding unit 450 and is encoded (Step S305). Then, the encoded eMBB data and the URLLC data are subjected to spreading modulation by using different codes (Step S306).

Both of the eMBB data that has been modulated or subjected to spreading modulation and the URLLC data that has been subjected to spreading modulation are mapped to the resource by the mapping unit 470 (Step S307). Specifically, the eMBB data modulated by the modulating unit 430 is arranged in the eMBB data area except for the multiplexing area that is fixedly provided in the resource for each TTI. Furthermore, eMBB data that has been subjected to spreading modulation by the spreading modulation unit 440 is arranged in the multiplexing area and, if the URLLC data has been generated, the URLLC data that has been subjected to spreading modulation by the spreading modulation unit 460 is also arranged in the multiplexing area.

In this way, because the eMBB data that has been subjected to spreading modulation by using the code is arranged in the multiplexing area regardless whether the URLLC data has been generated, there is no need to notify the user terminal device at the transmission destination of the eMBB data of presence or absence of the URLLC data.

The transmission signal that has been generated by the eMBB data and the URLLC data being mapped to the resource for each TTI is subjected to a predetermined radio transmission process by the radio transmission unit 400c (Step S308) and is then transmitted via the antenna (Step S309).

Figure 14:
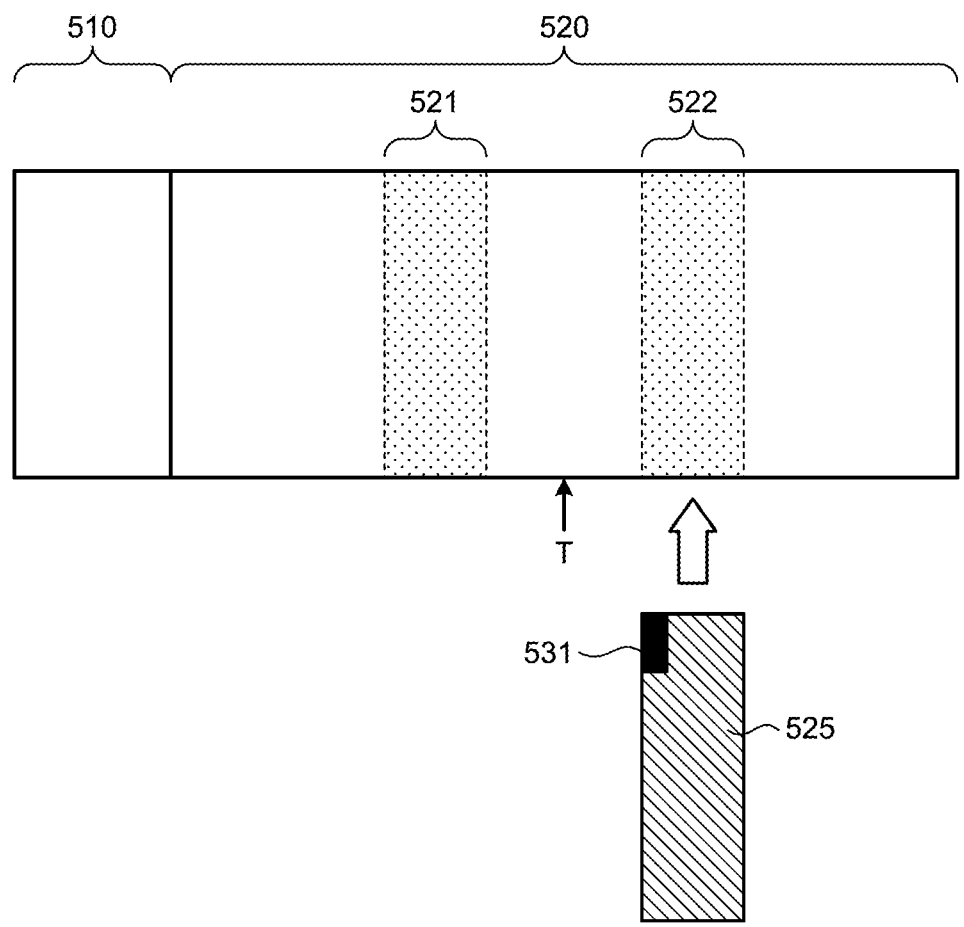
FIG. 14 is a diagram illustrating a specific example of TTI according to the third embodiment.

FIG. 14 is a diagram illustrating a specific example of the TTI according to the third embodiment. In FIG. 14, components having the same configuration as those illustrated in FIG. 11 are assigned the same reference numerals. As illustrated in FIG. 14, a single TTI has the eMBB control area 510 and the eMBB data area 520 and, in the eMBB data area 520, multiplexing areas 521 and 522 are provided. The base station device 400 maps the eMBB control information onto the eMBB control area 510 and maps the eMBB data onto the eMBB data area 520. However, the base station device 400 maps the eMBB data that has been subjected to spreading modulation onto each of the multiplexing areas 521 and 522. Furthermore, if the URLLC data has been generated, the base station device 400 performs spreading modulation on URLLC control information 531 and the URLLC data 525 and maps onto the multiplexing area.

In the example illustrated in FIG. 14, for example, because the URLLC data is generated at time T, in the multiplexing area 521 at the time at which the URLLC data has not been generated, only the eMBB data that has been subjected to spreading modulation is mapped. In contrast, in the multiplexing area 522 at the time immediately after the URLLC data has been generated, the URLLC control information 531 and the URLLC data 525 that have been subjected to spreading modulation are mapped.

As described above, according to the embodiment, the base station device arranges the eMBB data that has been subjected to spreading modulation in the multiplexing area regardless of whether the URLLC data has been generated and multiplexes, if the URLLC data has been generated, eMBB data and the URLLC data that subjected to spreading modulation in the multiplexing area. Consequently, it is possible to transmit the eMBB data by using the resource in the multiplexing area in a regular method regardless of whether the URLLC data is generated and, if the URLLC data has been generated, it is possible to transmit the eMBB data and the URLLC data by using the resource in the multiplexing area. As a result, it is possible to suppress a decrease in throughput of the eMBB data while efficiently using the resource in the multiplexing area even when the URLLC data is transmitted. Furthermore, because the eMBB data is subjected to spreading modulation in the multiplexing area and is transmitted, there is no need to notify the user terminal device at the transmission destination of the eMBB data of presence or absence of the URLLC data.

Furthermore, in each of the embodiments described above, a description has been given with the assumption that a multiplexing area is provided in the eMBB data area; however, the multiplexing area does not always need to be provided in the eMBB data area. Namely, in a case of data in which a request related to reliability and delay is smaller than that of the URLLC data, it may also be possible to provide, in the resource area that is allocated to other data, a multiplexing area in which the URLLC data and the other data can be multiplexed.

Furthermore, in each of the embodiments described above, a description has been given with the assumption that the URLLC control information is arranged in the multiplexing area; however, the URLLC control information does not always need to be arranged in the multiplexing area. Namely, if an association relationship between the URLLC control information and the multiplexing area can be specified, the URLLC control information may also be arranged in the area other than the multiplexing area. Furthermore, the URLLC control information may also be transmitted by being separated from the eMBB data and the URLLC data.

However, in order to implement low-latency transmission of the URLLC data, it is preferable that the timing at which the URLLC control information is transmitted be closer to the timing at which the URLLC data is transmitted.

According to an aspect of an embodiment of the radio communication apparatus, the radio communication system, and the transmission method disclosed in the present invention, an advantage is provided in that a decrease in throughput of other data is suppressed while maintaining the quality of URLLC data.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication apparatus comprising:
a processor that executes a process including:
modulating data to be transmitted by being arranged in a first resource area of a radio signal;
performing spreading modulation on data to be transmitted by being arranged in a second resource area provided in the first resource area, the spreading modulation using a first code orthogonal to a second code used to perform spreading modulation on other data to be transmitted in low latency compared with the data; and
mapping the data modulated at the modulating onto the first resource area and mapping the data subjected to the spreading modulation at the performing onto the second resource area; and
a transmitter that transmits a signal obtained at the mapping.

2. The radio communication apparatus according to claim 1, wherein the process further includes second preforming, by using the second code, spreading modulation on the other data, and
the mapping includes
mapping the data modulated at the performing onto the first resource area, and
multiplexing, in the second resource area, the data subjected to the spreading modulation at the performing and the other data subjected to the spreading modulation at the second performing.

3. The radio communication apparatus according to claim 2, wherein
the performing includes performing the spreading modulation on the data to be transmitted by being arranged in the second resource area, when the other data to be subjected to the spreading modulation at the second performing is generated, and
the modulating includes modulating the data to be transmitted by being arranged in the second resource area without performing spreading modulation, when data to be subjected to the spreading modulation at the second performing is not generated.

4. The radio communication apparatus according to claim 2, wherein the process further includes performing puncturing on the data to be transmitted by being arranged in the second resource area, when the other data to be subjected to the spreading modulation at the second performing is generated, and the performing includes performing the spreading modulation on the data subjected to the puncturing.

5. A radio communication system comprising:

a first terminal device; and a second terminal device, wherein the first terminal device includes a first processor that executes a process including:

modulating data to be transmitted by being arranged in a first resource area of a radio signal, performing, by using a code, spreading modulation on data to be transmitted by being arranged in a second resource area provided in the first resource area, mapping the data modulated at the modulating onto the first resource area and mapping the data subjected to the spreading modulation at the performing onto the second resource area, and a first transmitter that transmits a signal obtained at the mapping, and the second terminal device includes a second processor that executes a process including:

second performing, by using a code, spreading modulation on other data that is requested to be transmitted in low latency compared with the data, second mapping the other data subjected to the spreading modulation at the second performing onto the second resource area, and a second transmitter that transmits the signal obtained at the second mapping.

6. A transmission method comprising:

modulating data to be transmitted by being arranged in a first resource area of a radio signal;

performing spreading modulation on data to be transmitted by being arranged in a second resource area provided in the first resource area, the spreading modulation using a first code orthogonal to a second code used to perform spreading modulation on other data to be transmitted in low latency compared with the data;

mapping the modulated data onto the first resource area and mapping the data subjected to the spreading modulation onto the second resource area; and transmitting a signal obtained by the mapping.

* * * * *